(12) United States Patent
Kirsch et al.

(10) Patent No.: US 11,718,133 B2
(45) Date of Patent: Aug. 8, 2023

(54) CHASSIS CONTROL ARM

(71) Applicant: THK Co., LTD., Tokyo (JP)

(72) Inventors: Vadim Kirsch, Duesseldorf (DE);
Manjunatha Madivala, Duesseldorf (DE); Tamil Selvan Rajagopal, Duesseldorf (DE); Wataru Saito, Tokyo (JP); Marius Tillman, Duesseldorf (DE); Harald Walter, Duesseldorf (DE)

(73) Assignee: THK Co., LTD., Tokyo (JP)

( * ) Notice: Subject to any disclaimer, the term of this patent is extended or adjusted under 35 U.S.C. 154(b) by 0 days.

(21) Appl. No.: 17/084,140

(22) Filed: Oct. 29, 2020

(65) Prior Publication Data

US 2021/0129611 A1     May 6, 2021

(30) Foreign Application Priority Data

Oct. 31, 2019   (DE) ...................... 10 2019 129 431.2

(51) Int. Cl.
*B60G 7/00* (2006.01)
*B60G 17/02* (2006.01)
*F16F 1/04* (2006.01)

(52) U.S. Cl.
CPC ............. *B60G 7/008* (2013.01); *B60G 7/001* (2013.01); *B60G 2204/12* (2013.01);
(Continued)

(58) Field of Classification Search
CPC ........ B60G 7/001; B60G 7/006; B60G 7/008; B60G 2204/12; B60G 2204/1244; B60G 2204/419; B60G 2204/4191; B60G 2204/4192; B60G 2204/62; B60G 2206/10; B60G 2206/81012; B60G 2206/8201;
(Continued)

(56) References Cited

U.S. PATENT DOCUMENTS

| 7,237,780 B2 | 7/2007 | Ohki |
| 10,967,693 B2 * | 4/2021 | Meyer ...................... B60G 3/02 |

(Continued)

FOREIGN PATENT DOCUMENTS

| DE | 102006049726 A1 | 4/2008 | |
| DE | 102010053334 A1 * | 6/2012 | ........... B60G 15/063 |

(Continued)

OTHER PUBLICATIONS

Description Translation for DE102010053334 from Espacenet (Year: 2012).*

(Continued)

*Primary Examiner* — Jason D Shanske
*Assistant Examiner* — Daniel M. Keck
(74) *Attorney, Agent, or Firm* — McNees Wallace & Nurick LLC (57) ABSTRACT

A chassis control arm for a wheel suspension has a control arm body, a spring abutment and an actuator which is arranged between the control arm body and the spring abutment and with which the position of the spring abutment relative to the control arm body can be adjusted. The actuator comprises a lifting gear which is configured as a movement thread and which includes a lifting spindle on which the spring abutment is arranged or on which the spring abutment is axially movably mounted.

15 Claims, 8 Drawing Sheets

(52) U.S. Cl.
CPC .... *B60G 2204/419* (2013.01); *B60G 2204/62* (2013.01); *B60G 2206/10* (2013.01); *B60G 2206/70* (2013.01); *B60G 2206/81012* (2013.01); *B60G 2206/8201* (2013.01); *B60G 2206/821* (2013.01); *B60G 2206/8206* (2013.01); *B60G 2206/8207* (2013.01)

(58) Field of Classification Search
CPC .... B60G 2206/8206; B60G 2206/8207; B60G 2206/821; B60G 17/021; B60G 2202/12; B60G 2202/42; B60G 2500/30; B60G 11/16; F16F 1/041
See application file for complete search history.

(56) References Cited

U.S. PATENT DOCUMENTS

| | | | | |
|---|---|---|---|---|
| 2004/0232648 | A1* | 11/2004 | Ohki | B60G 15/02 280/124.164 |
| 2006/0108761 | A1* | 5/2006 | Lamb | F16F 9/38 280/124.1 |
| 2009/0223322 | A1* | 9/2009 | Kossira | B62D 5/0418 280/5.52 |
| 2013/0200578 | A1* | 8/2013 | Kohlhauser | B60G 17/021 280/5.51 |
| 2016/0193890 | A1* | 7/2016 | Dobre | B60G 17/021 280/5.514 |
| 2017/0203624 | A1* | 7/2017 | Mielke | B60G 7/02 |
| 2019/0226562 | A1 | 7/2019 | Hochmuth et al. | |
| 2020/0247204 | A1* | 8/2020 | Fortmeier | B60G 7/001 |

FOREIGN PATENT DOCUMENTS

| | | | | |
|---|---|---|---|---|
| DE | 102015208089 | A1 | 11/2016 | |
| DE | 102016213425 | A1 | 1/2018 | |
| DE | 102018128595 | A1 * | 5/2020 | |
| EP | 1479542 | A2 | 11/2004 | |
| FR | 2840257 | A1 * | 12/2003 | .......... B60G 15/065 |
| JP | 2007253862 | A | 10/2007 | |
| WO | WO-03022604 | A2 * | 3/2003 | ............ B60G 17/02 |
| WO | 2016200030 | A1 | 12/2016 | |

OTHER PUBLICATIONS

Description Translation for FR 2,840,257 from Espacenet (Year: 2003).*

* cited by examiner

CHASSIS CONTROL ARM

This invention relates to a chassis control arm for a wheel suspension, in particular of a motor vehicle.

BACKGROUND OF THE INVENTION

Chassis control arms are essential components of a chassis of a vehicle, as they create a connection between a wheel and a body of the vehicle and ensure safe wheel guidance. The chassis control arms transmit for example the transverse forces between wheel and body. Moreover, the chassis control arms guide the wheel in a substantially vertical direction.

For damping and cushioning the vertical movements of the wheel relative to the vehicle body, which occur while the vehicle is in motion, a shock absorber and a spring are provided between the chassis control arm and the body.

If the ground clearance of the vehicle is to be kept constant also with different loading conditions, a so-called level regulation is used, which mostly is configured as electrohydraulic or electropneumatic systems. Such electrohydraulic or electropneumatic systems occupy a very large installation space in the vehicle due to the reservoir for the medium used and due to the lines and pumps, and represent a large additional weight. Moreover, such systems are susceptible to leaks and represent a considerable cost factor.

It is the object of the invention to create an alternative possibility for the level regulation of the vehicle while avoiding the disadvantages of the prior art.

BRIEF DESCRIPTION OF THE INVENTION

According to the invention, this object is achieved by a chassis control arm for a wheel suspension, which includes a control arm body, a spring abutment and an actuator which is arranged between the control arm body and the spring abutment and with which the position of the spring abutment relative to the control arm body can be adjusted. The actuator comprises a lifting gear which is configured as a movement thread and which includes a lifting spindle on which the spring abutment is arranged or on which the spring abutment is axially movably mounted. Thus, the axial or rotational movement of the lifting spindle is transmitted to the spring abutment, whereby it is axially shifted along the actuator axis.

Expressed in other words, the actuator can be used to adjust a distance between the control arm body and the spring abutment. By actuating the actuator, the spring abutment can be shifted along the actuator axis. As a result a spring arranged between the spring abutment and a body, and at the same time the body, is shifted in particular perpendicularly to the road surface. In this way, the distance between the control arm body and the spring as well as the distance between body and ground (ground clearance) can be adjusted. Expressed in other words, a level regulation of the vehicle can be effected by the actuator, by which for example a load compensation can be created, loading can be facilitated, the driving dynamics can be influenced by simulating the effect of a stabilizer, or the aerodynamic properties can be changed.

By means of the lifting gear, a rotational movement of a drive or a drive gear of the actuator can be converted into a translational movement of the spring abutment with little space requirement.

For example, the movement thread is a recirculating ball drive or a trapezoidal thread drive. The trapezoidal thread drive has a high loadability, and little friction occurs during an operation of the recirculating ball drive.

The lifting gear can be configured as a telescopic lifting gear. During operation a stroke is produced, which is greater than an overall height of the gear unit. In this way, more space can be saved.

Optionally, the lifting gear can be self-locking so that no additional components are needed for locking the spring abutment in a position.

Alternatively, the actuator can include a separate arresting device by which a movable part of the lifting gear can be arrested, in particular positively or non-positively, in various positions. When the arrestment is released, less expenditure of force is necessary in order to carry out the translational movement of the spring abutment via the lifting gear, as the lifting gear here is not self-locking.

For example, arresting can be effected electromechanically, for example by a lifting magnet.

For example, it can also be provided that arresting is mechanically effected by the actuator movement itself. In this way, additional components of a separate arresting device can be saved.

Furthermore, the rotational movement of a motor shaft of the drive, for example of a brush motor, can be arrested so that the spring abutment remains in its current position. Thus, additional components for an arrestment within the lifting gear can be avoided.

Another aspect provides that the spring abutment is mounted directly on the lifting spindle, in particular directly on the lifting spindle. Accordingly no further, primarily force- or motion-transmitting component is arranged between the spring abutment and the lifting spindle. This saves space and ensures an efficient transmission of force or movement.

The lifting spindle can at least partially be received in the actuator housing. In this way, a secure hold of the lifting spindle in the actuator housing is ensured.

In particular, the lifting spindle as axially shiftably or rotatably mounted in the actuator housing. This provides for a movement of the lifting spindle and accordingly of the spring abutment.

In one embodiment, the lifting thread comprises a lifting nut which in particular is an integral part of the spring abutment. In this way, components and installation space can be saved.

In particular, the lifting nut can be axially adjusted by the lifting spindle.

Optionally, the spring abutment can be mounted on the lifting spindle via the lifting nut. This also saves components and installation space.

Preferably, the actuator is of the electromechanical type. As a result, no reservoirs for a medium, lines and pumps are necessary, whereby much installation space and weight can be saved.

One embodiment provides that the actuator includes a housing on which at least one fastening means is mounted for the positive and/or non-positive attachment of the actuator housing to the control arm body. The housing protects the internal components of the actuator from external influences, such as for example liquid, dirt or stone impact, and at the same time serves the attachment of the actuator to the control arm body. The positive and/or non-positive attachment can be released relatively easily so that an easy replacement of the actuator is possible. In addition, the actuator can be fabricated separately from the control arm body, whereby the entire manufacture of the chassis control arm is simplified.

In particular, the actuator housing is attached to the control arm body by a screw connection, a rivet connection, a clip connection and/or a clinch connection. These connections can be manufactured relatively easily and at low cost and partly can be released again very easily.

The fastening means are screws, rivets, latching hooks or deformed protrusions.

The latching hook for example can be integrally molded to the actuator housing, whereby the actuator housing can be manufactured easily.

Alternatively, the latching hook can be formed separately from the actuator housing and be attached to the actuator housing. In the case of a heavily loaded connection between the actuator housing and the control arm body, the latching hook thus can be separately manufactured from a more stable material, and a reliable connection between the actuator housing and the control arm body can be ensured thereby. At the same time, the manufacturing costs can be reduced, as not the entire actuator housing must be fabricated from the stable and more expensive material.

In another embodiment, the actuator has a housing which is at least cohesively attached to the control arm body. Due to the cohesive connection, the actuator housing and the control arm body can be connected to each other most reliably and the number of separate individual parts can be reduced as compared to a positive and/or non-position attachment. Moreover, the actuator can be fabricated separately from the control arm body, whereby the entire manufacture of the chassis control arm is simplified.

In particular, the actuator housing is attached to the control arm body by a weld connection, a solder connection, an adhesive connection and/or an injection-molded connection. These connections are reliable and durable and can be manufactured relatively easily and at low cost.

The actuator housing and the control arm body can be made of the same material. This can provide for an easy manufacture.

Alternatively, the actuator housing and the control arm body can be made of different materials. In this ways, areas with less load can be made of a less expensive material.

According to another embodiment, the control arm body is shaped such that the control arm body forms at least part of a housing for the actuator. As a result, less parts must be used for manufacturing the control arm body and the actuator housing, and weight can be saved in addition. Moreover, the at least one part of the actuator housing is automatically manufactured along with the control arm body, whereby additional manufacturing steps are omitted.

It can be provided that the control arm body forms a sub-housing and the actuator housing forms a sub-housing of the actuator, which are mounted to each other via one or more of the above-mentioned fastening methods. The actuator can easily be inserted into the sub-housing of the control arm body and, depending on the fastening method, can easily be removed from the sub-housing of the control arm body.

Another embodiment provides that the control arm body is a metal-plastic composite component. On the one hand, the actuator housing can be fastened in the control arm body via the plastic component, or the plastic component itself forms at least part of the actuator housing. On the other hand, the light-weight plastic component considerably reinforces the control arm body so that material for manufacturing the control arm body can be saved, which would be necessary to achieve the same rigidity without the plastic component. The weight and the material expenditure for manufacturing the control arm body can thereby be reduced distinctly. Accordingly, the plastic component fulfills a multiple function.

One aspect provides that the control arm body includes a mounting flange against which a flange-like protrusion of the actuator housing rests. The flanges are easily accessible and thereby are very recommendable for the attachment of the actuator housing to the control arm body.

In particular, the control arm body in cross-section forms a receiving space in which the actuator is integrated or received. The receiving space serves as a kind of protective space for protecting the actuator from external influences, such as stone impact, dirt, humidity or the like.

For example, the control arm body is H- or U-shaped in cross-section. Due to the H- or U-shape the receiving space is formed, in which the actuator can be received. The mounting flange can be mounted on an open side of the H or U and protrude substantially perpendicularly from the control arm body to the outside.

The actuator can be part of an active chassis which is brought into different operating states by a control unit or for which an operator can preselect different modes. For example, different driving modes with a different ground clearance or cornering of the vehicle can be selected manually, or better driving dynamics can be achieved by an automatic actuation of the actuator.

Furthermore, the object according to the invention is achieved by a chassis control arm for a wheel suspension, comprising a control arm body, a spring abutment and an actuator which is arranged between the control arm body and the spring abutment and by which the position of the spring abutment relative to the control arm body can be adjusted. The actuator comprises a lifting gear which is configured as a movement thread and which includes a lifting spindle on which the spring abutment is arranged or on which the spring abutment is axially movably mounted. The lifting gear also includes a lifting nut which is rotatably mounted in the actuator housing and axially adjusts the lifting spindle. Due to being mounted in the actuator housing, the lifting nut and the bearing are protected from external influences, such as dirt, liquid or stone impact. Moreover, the axial movement of the lifting spindle and of the spring abutment can be achieved by the rotational movement in a way saving installation space.

The described advantages and features of the chassis control arms according to the invention equally apply for all of the described chassis control arms.

BRIEF DESCRIPTION OF THE DRAWINGS

Further advantages and properties of the invention can be taken from the following description and from the attached drawings to which reference is made. In the drawings.

DETAILED DESCRIPTION OF THE INVENTION

Figure 1:
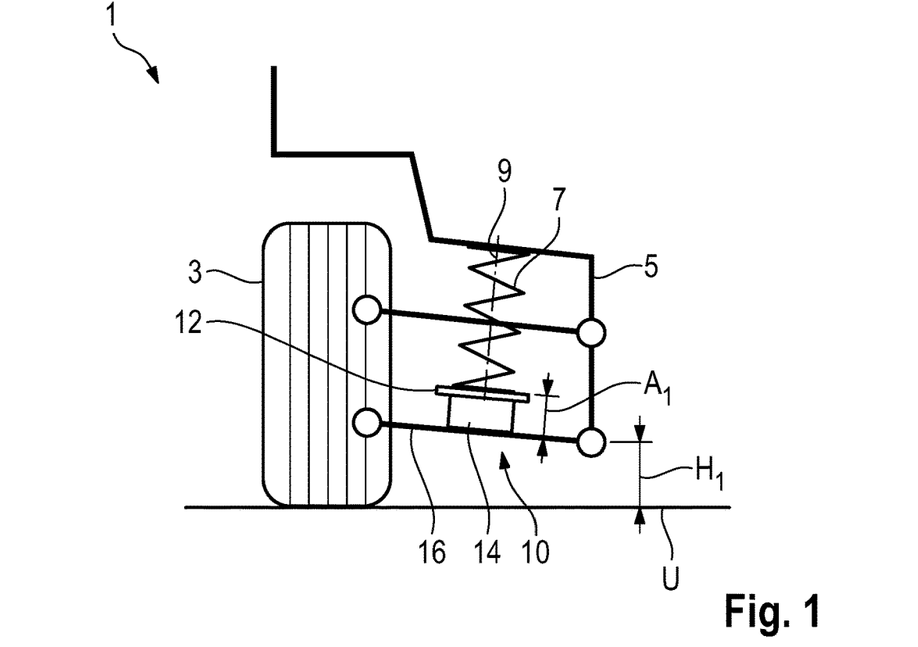
FIG. 1 shows a schematic view of a wheel suspension with a chassis control arm according to the invention, in which an actuator is in a retracted state.
Figure 2:
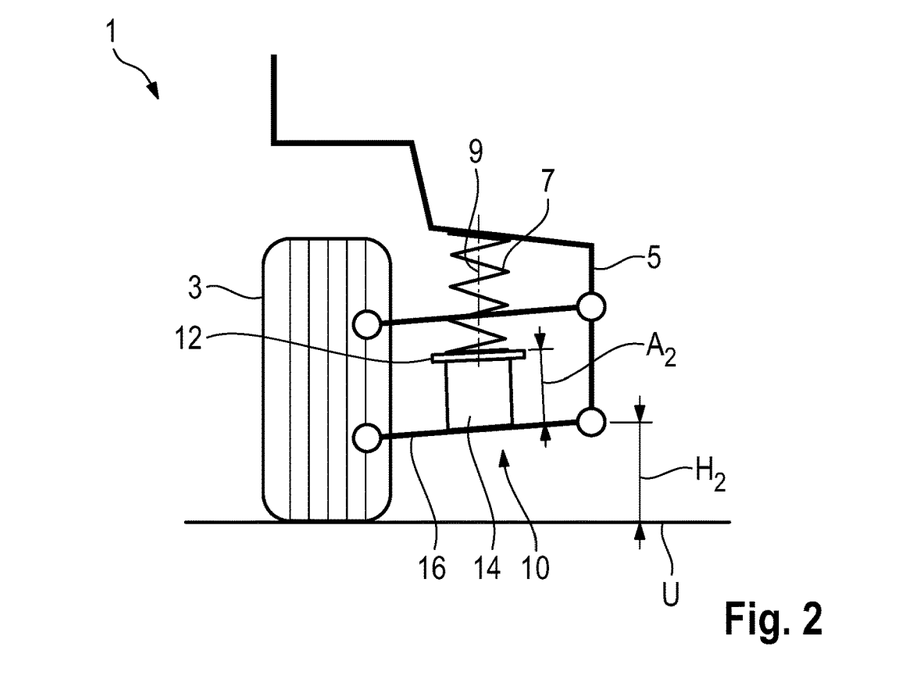
FIG. 2 shows a schematic view of the wheel suspension with the chassis control arm according to the invention as shown in FIG. 1, in which the actuator is in an extended state.

FIGS. 1 and 2 show a wheel suspension 1 by which a wheel 3 is substantially vertically movably attached to a body 5 of a vehicle via at least one chassis control arm 10. Furthermore, a spring 7, a spring abutment 12 and an actuator 14 are arranged between the body 5 and the chassis control arm 10.

The actuator 14 is attached to a control arm body 16 of the chassis control arm 10 and carries the spring abutment 12. The spring 7 with one end is supported on the spring abutment 12 and with the other end on the body 5.

A distance A between the control arm body 16 and the spring abutment 12 and thus a position of the spring abutment 12 relative to the control arm body 16 can be adjusted via the actuator 14.

Depending on the distance A, a height H of a lower edge of the body 5 above an underground U turns out to be larger or smaller. Thus, the height H corresponds to a ground clearance of the vehicle.

When the actuator 14 is actuated such that the distance A is increased from a first value A1 (cf. FIG. 1) to a second value A2 (cf. FIG. 2) by a difference value ΔA, the spring abutment 12 and hence the spring 7 is translationally shifted by the difference value ΔA along an actuator adjustment axis. The height H and hence the ground clearance of the vehicle thereby is increased by a difference value ΔH from a first value $H_1$ (cf. FIG. 1) to a second value $H_2$ (cf. FIG. 2).

Analogously, the ground clearance of the vehicle likewise is decreased with a decrease of the distance A.

Figure 3:
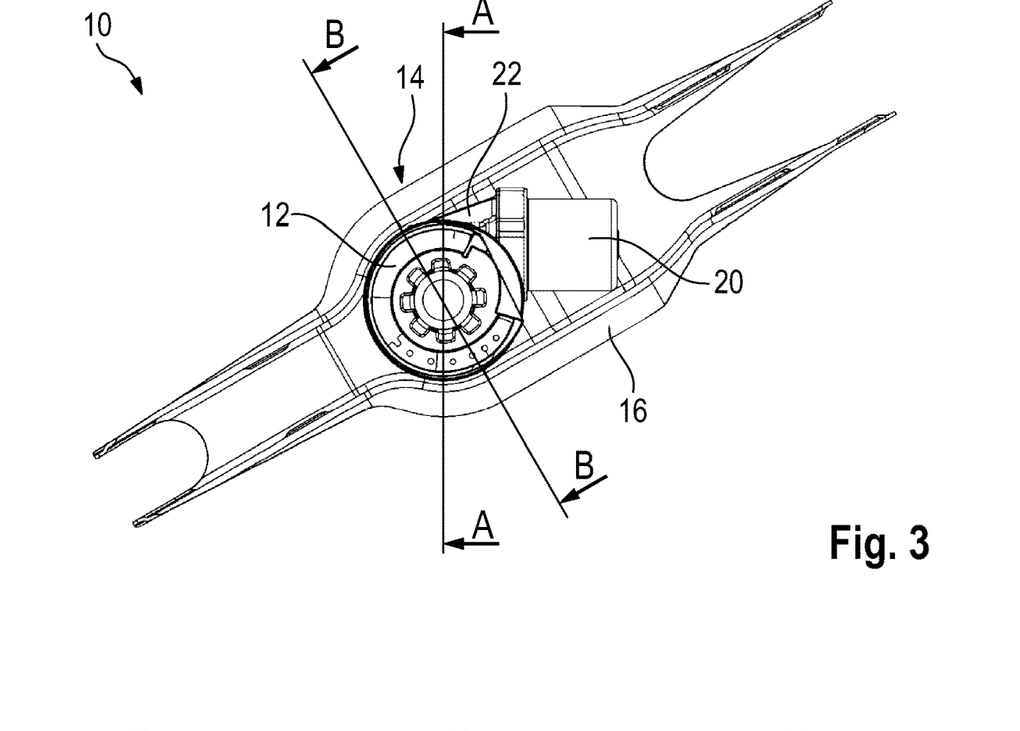
FIG. 3 shows a top view of the chassis control arm according to the invention as shown in FIGS. 1 and 2.
Figure 4:
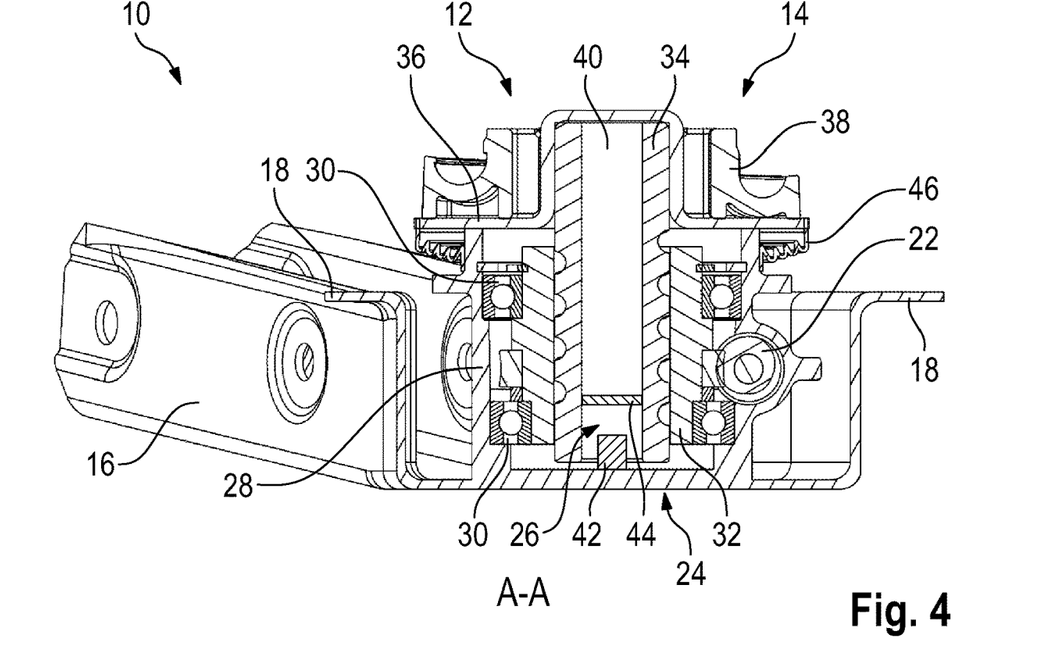
FIG. 4 shows a sectional view of the chassis control arm of the invention according to section A-A of FIG. 3, in which the actuator is in a retracted state.
Figure 5:
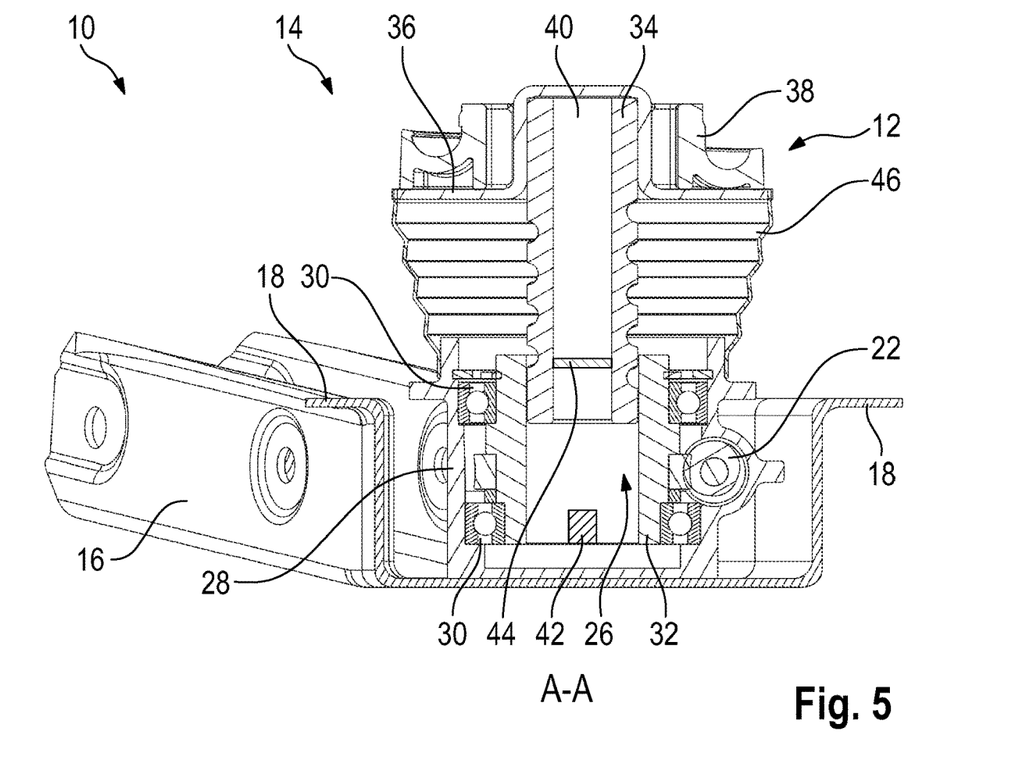
FIG. 5 shows a sectional view of the chassis control arm of the invention according to section A-A of FIG. 3, in which the actuator is in an extended state.

In FIGS. 3 to 5 the chassis control arm 10 is shown in detail. FIG. 3 shows a top view of the chassis control arm 10. As already described above, the chassis control arm 10 comprises the control arm body 16 and the actuator 14 attached to the control arm body 16. The spring abutment 14 is arranged on the actuator 14.

In this embodiment, the control arm body 16 has a U-shaped cross-section by which a receiving space is formed, in which the actuator 14 is at least partly received.

To the open side of the U a mounting flange 18 is integrally molded, which protrudes substantially perpendicularly from the control arm body 16 to the outside.

The cross-section of the control arm body 16 of course is not limited to a U-shape, but can have any other shape, for example an H-shape.

The control arm body 16 can be configured for example as a two-point control arm, three-point control arm or four-point control arm and can be provided in an independent wheel suspension or a twist beam axle.

In FIGS. 4 and 5 the actuator 14 is shown in detail.

The actuator 14 comprises a drive 20, a drive gear 22, a lifting gear 24, a position sensor system 26 and an actuator housing 28 (cf. FIGS. 4 and 5).

The position sensor system 26 is optional.

The drive 20 can be of the electric type and can be configured as a brushed or brushless d.c. machine or as a reluctance machine.

The drive gear 22 can be configured for example as a worm gear, planetary gear, traction means transmission, spur gear transmission and/or eccentric gear and transmits, in particular steps down the rotational movement of a shaft of the drive 20 to the lifting gear 24.

The lifting gear 24 used is a movement thread which in this embodiment is a recirculating ball drive or trapezoidal thread drive. Depending on the space available, the lifting gear 24 can be of the simple or telescopic type.

In the exemplary embodiment shown here the lifting gear 24 comprises a lifting nut 32 rotationally movably mounted in the actuator housing 28 via a bearing 30, in which lifting nut a lifting spindle 34 is axially movably mounted.

The spring abutment 12 is arranged on the lifting spindle 34. In this embodiment, the spring abutment 12 includes a spring plate 36 and a holder 38 arranged on the spring plate 36.

The spring 7 can be received in the holder 38.

The optional position sensor system 26 can be provided in an installation space 40 delimited by the lifting spindle 34. The position sensor system 26 can detect a movement of the lifting spindle 34 at least optically, electrically, capacitively, resistively, inductively and/or magnetically.

A first position detection component 42, for example a Hall sensor, can be mounted on a base surface of the actuator 14, and a second position detection component 44, for example a magnet, can be mounted within the lifting spindle 34. The positioning of the position detection components 42, 44 of course is to be understood only by way of example.

Alternatively, the movement of the lifting spindle 34 can be detected by a detection of the rotation of the motor shaft of the drive 20.

For protection against an ingress of liquid or foreign matter a seal 46 in the form of a bellows is arranged between the actuator housing 28 and the spring abutment 12. In the extended state of the lifting spindle 34 as shown in FIG. 5, the bellows can be seen more exactly.

In the case of a manually or automatically actuated actuation of the actuator 14 the drive 20 is activated, via which an input shaft of the drive gear 22 is put into rotation. The drive gear 22 is operatively coupled with the lifting nut 32 and transmits the rotational movement to the lifting nut 32, which thereby is likewise put into a rotational movement about a longitudinal axis of the actuator 14.

The lifting nut 32 is coupled with the lifting spindle 34 in such a way that the rotational movement of the lifting nut 32 is converted into a translational axial movement of the lifting spindle 34.

The second position detection component 44 also moves along with the lifting spindle 34, whereby a distance between the second position detection component 44 and the first position detection component 42 is changed. The change in distance can be detected by the first position detection component 42 and can be associated with a particular position of the lifting spindle 34 in a control unit (not shown).

The lifting spindle 34 moves the spring abutment 12 and accordingly the spring plate 36 and the holder 38 upwards or downwards depending on the direction of the axial movement, whereby the distance A between the spring abutment 12 relative to the control arm body 16 is changed. Due to the displacement of the lifting spindle 34 and hence of the spring abutment 12, a spring 7 supported on the spring abutment 12 is shifted along the longitudinal axis of the actuator 14 or of the spring axis 9.

Depending on the kind of lifting gear 24, the position of the lifting spindle 34 can be arrested without any additional arresting device.

A trapezoidal thread drive as lifting gear 24 is self-locking, whereby a non-positive arrestment is effected by a combination of the frictions in the lifting gear 24, in the drive gear 22 and in the drive 20.

A recirculating ball drive as lifting gear 24 on the other hand is not self-locking and correspondingly must be arrested separately. For this purpose, the rotational movement of the motor shaft of the drive 20, of the input shaft of the drive gear 22, of the lifting nut 32 and/or the translational movement of the lifting spindle 34 can be prevented positively or non-positively.

For this purpose a separate arresting device (not shown) can be used. The activated arresting device inhibits a movement of the lifting spindle, of the lifting nut, of the input shaft and/or of the motor shaft, in particular in a positive and/or non-positive way.

The arrestment can be effected for example mechanically or electromechanically by a second actuator, for example a lifting magnet.

Figure 6:
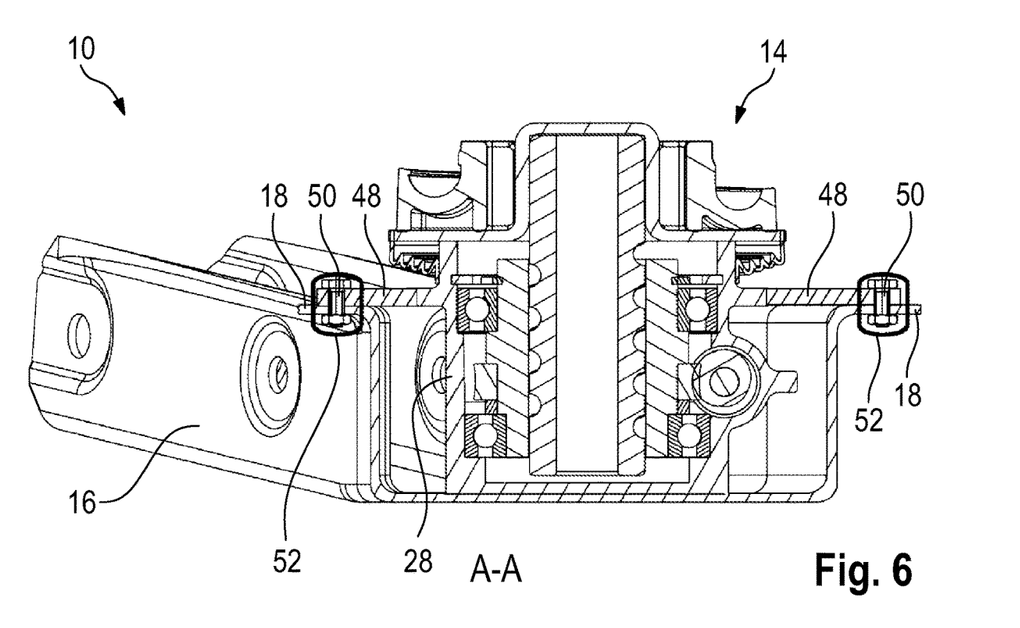
FIG. 6 shows a sectional view of a first variant of attachment of the actuator to a control arm body of the chassis control arm of the invention according to section A-A of FIG. 3.

FIG. 6 shows a chassis control arm 10 in which the actuator 14 in a first variant of attachment is mounted to the control arm body 16. The actuator 14 here is shown in the retracted state and is almost identical to the actuator 14 as shown in FIGS. 3 to 5. To the actuator 14 as shown in FIG. 6 merely a flange-like protrusion 48 is laterally mounted or integrally molded to the actuator housing 28.

The flange-like protrusion 48 rests on the mounting flange 18 of the control arm body 16.

The attachment of the actuator 14 to the control arm body 16 here is effected by a screw connection 52. For this purpose, the two flanges 18, 48 are attached to each other by means of screws as fastening means 50.

The control arm body 16 and the actuator housing 28 here can be made of a metallic material, a plastic material or a hybrid material.

For example, the control arm body 16 and/or the actuator housing 28 is/are made of a glass fiber or carbon fiber reinforced plastic material.

Figure 7:
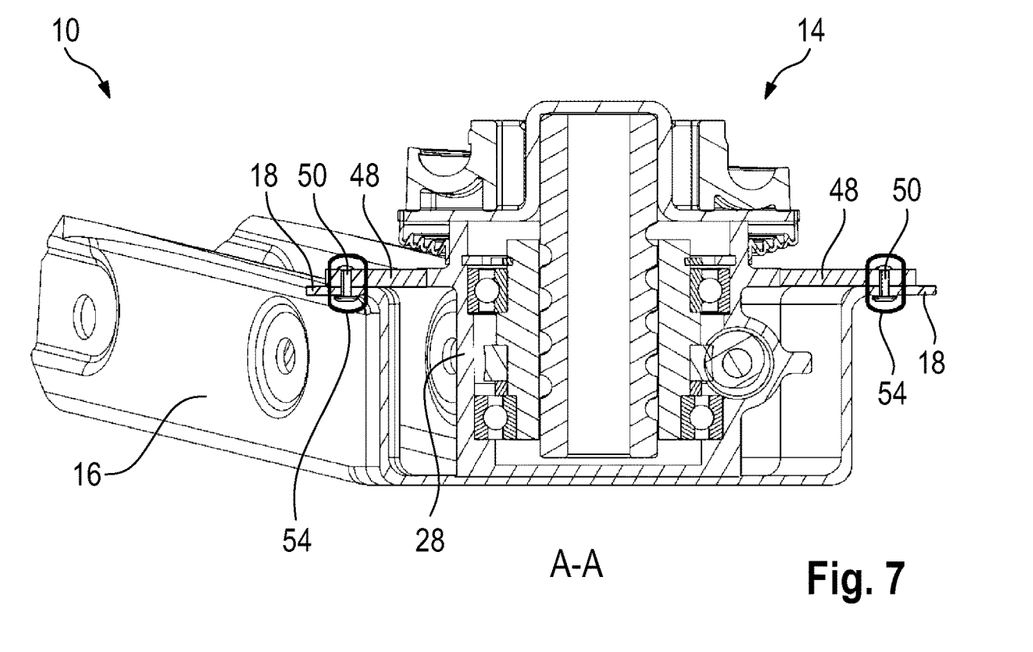
FIG. 7 shows a sectional view of a second variant of attachment of the actuator to the control arm body of the chassis control arm of the invention according to section A-A of FIG. 3.

FIG. 7 shows an alternative in which the actuator 14 is attached to the control arm body 16 by a rivet connection 54. For this purpose, the two flanges 18, 48 are attached to each other by means of rivets as fastening means 50.

Figure 8:
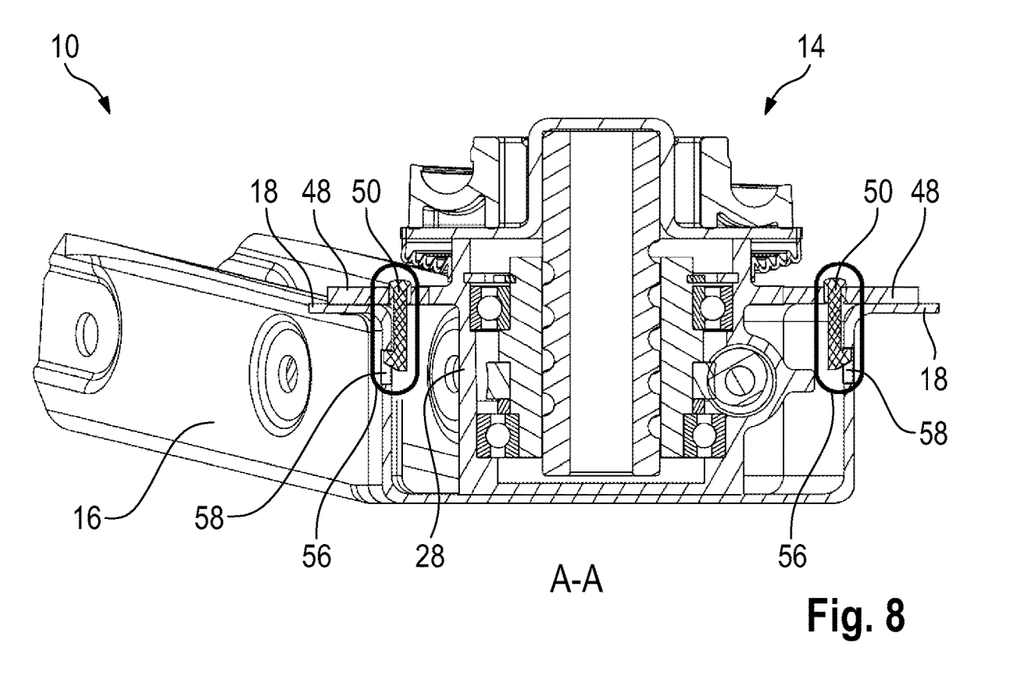
FIG. 8 shows a sectional view of a third variant of attachment of the actuator to the control arm body of the chassis control arm of the invention according to section A-A of FIG. 3.

In a third variant of attachment as shown in FIG. 8 the attachment of the actuator 14 to the control arm body 16 is effected by a positive clip connection 56. For this purpose, latching hooks as fastening means 50 are separately mounted or integrally molded to the flange-like protrusion 48. The latching hooks engage into notches or openings 58 provided for this purpose in the control arm body 16 and thereby form the positive connection.

The first three variants of attachment as shown in FIGS. 6 to 8 are characterized by the fact that the attachment can be released again relatively easily.

Figure 9:
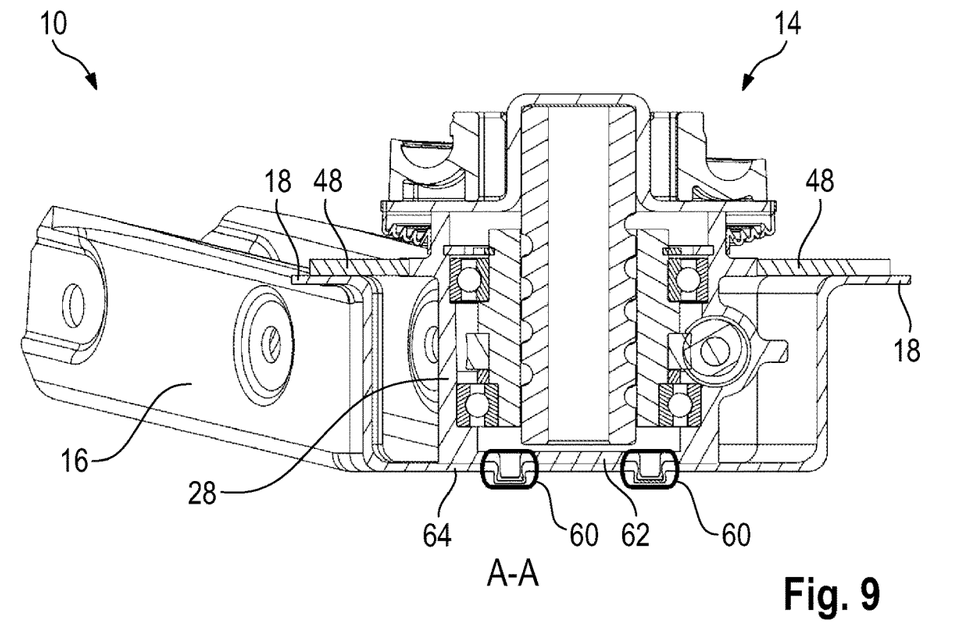
FIG. 9 shows a sectional view of a fourth variant of attachment of the actuator to the control arm body of the chassis control arm of the invention according to section A-A of FIG. 3.

FIG. 9 shows a fourth variant of attachment in which the actuator 14 is attached to the control arm body 16 by a positive clinch connection 60. For this purpose, the control arm body 16 and the actuator housing 28 are configured of a metallic material, and a positive connection between the control arm body 16 and the actuator housing 28 is produced by plastic deformation.

In the embodiment shown here, the plastic deformation is effected on a base surface 62 of the actuator housing 28 and a base surface 64 of the control arm body 16. Here, the flanges 18, 48 are not necessary for the attachment.

Of course, the plastic deformation for example can also be effected in the vicinity of the flanges 18, 48.

Figure 10:
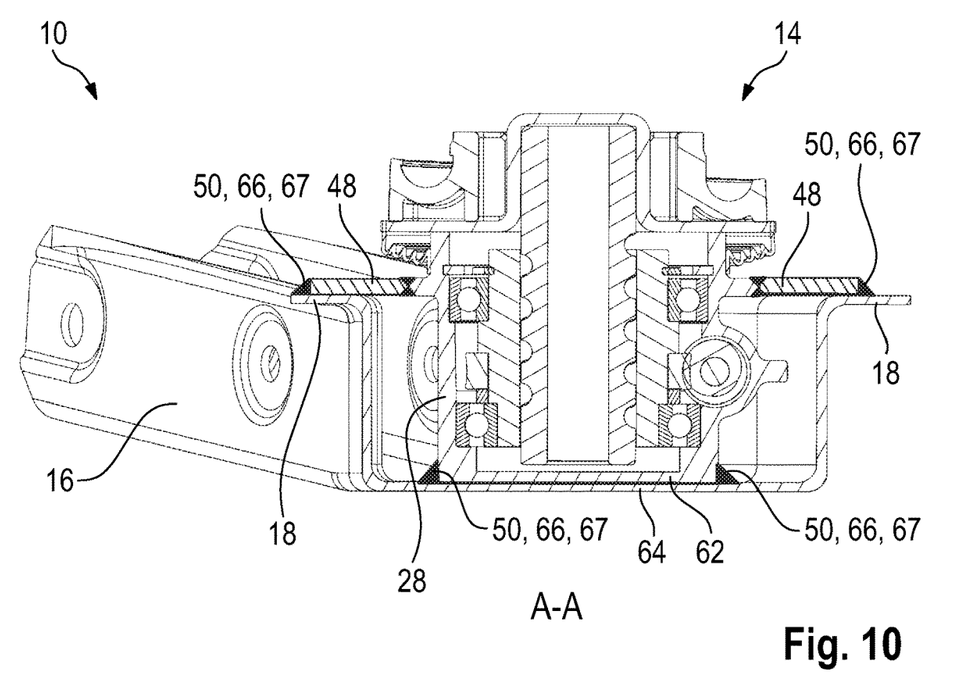
FIG. 10 shows a sectional view of a fifth and sixth variant of attachment of the actuator to the control arm body of the chassis control arm of the invention according to section A-A of FIG. 3.

According to a fifth variant of attachment as shown in FIG. 10, the attachment of the actuator housing 28 to the control arm body 16 is effected by a positive weld connection. For this purpose, for example, the two flanges 18, 48 and/or the two base surfaces 62, 64 are welded to each other.

The control arm body 16 and the actuator housing 28 here can be made of a metallic material, a thermoplastic plastic material or a thermoplastic hybrid material and can be welded with the same material pairing each.

Alternatively, the attachment in a sixth variant of attachment can be effected by a cohesive solder connection 67 analogous to the weld connection 66. For this purpose, the control arm body 16 and the actuator housing 28 are configured of a metallic material and are soldered.

In the fifth and sixth variants of attachment, the weld or solder material represents the fastening means 50.

Figure 11:
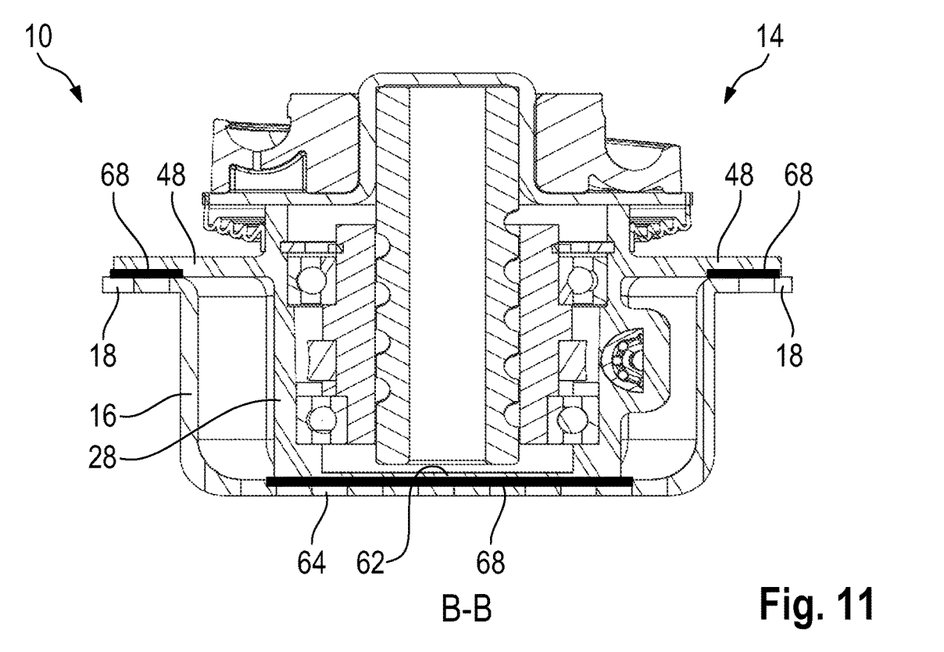
FIG. 11 shows a sectional view of a seventh variant of attachment of the actuator to the control arm body of the chassis control arm of the invention according to section B-B of FIG. 3.

FIG. 11 shows a sixth variant of attachment in which the actuator housing 28 is attached to the control arm body 16 by a bonded hot-melt adhesive connection 68. For this purpose, the control arm body 16 is configured of a metallic material and the actuator housing 28 is configured of a thermoplastic material.

For connecting the actuator housing 28 to the control arm body 16, the control arm body 16 is heated to the melting temperature of the plastic material of the actuator housing 28, for example by laser or induction heating. Subsequently, the actuator housing 28 in the final position is pressed onto the heated control arm body 16, whereby the plastic material of the actuator housing 28 melts on its surface due to the temperature of the control arm body 16 and after solidification undergoes a cohesive connection with the control arm body 16.

Figure 12:
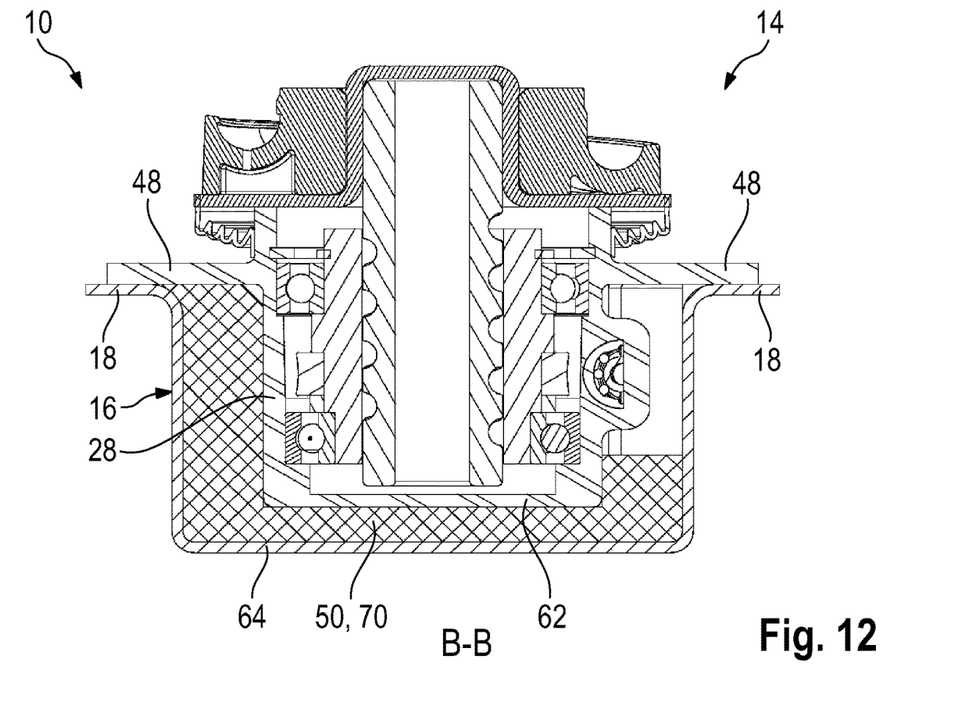
FIG. 12 shows a sectional view of an eighth variant of attachment of the actuator to the control arm body of the chassis control arm of the invention according to section B-B of FIG. 3.

FIG. 12 shows a seventh variant of attachment in which the actuator housing 28 is attached to the control arm body 16 by a cohesive injection-molded connection 70. The control arm body 16 and the actuator housing 28 therefor are configured of a metallic material.

The control arm body 16 and the actuator housing 28 are inserted into an injection molding tool as insert parts in the final position, wherein the tool halves form a seal on the two insert parts so that between control arm body 16, actuator housing 28 and the tool halves a cavity is obtained. In the injection molding process a thermoplastic or thermosetting plastic material is injected into the cavity, which after solidification cohesively connects the control arm body 16 and the actuator housing 28. To increase the bonding strength, the insert parts can previously be wetted with an adhesion promoter.

The injection molding material here represents the fastening means 50.

Figure 13:
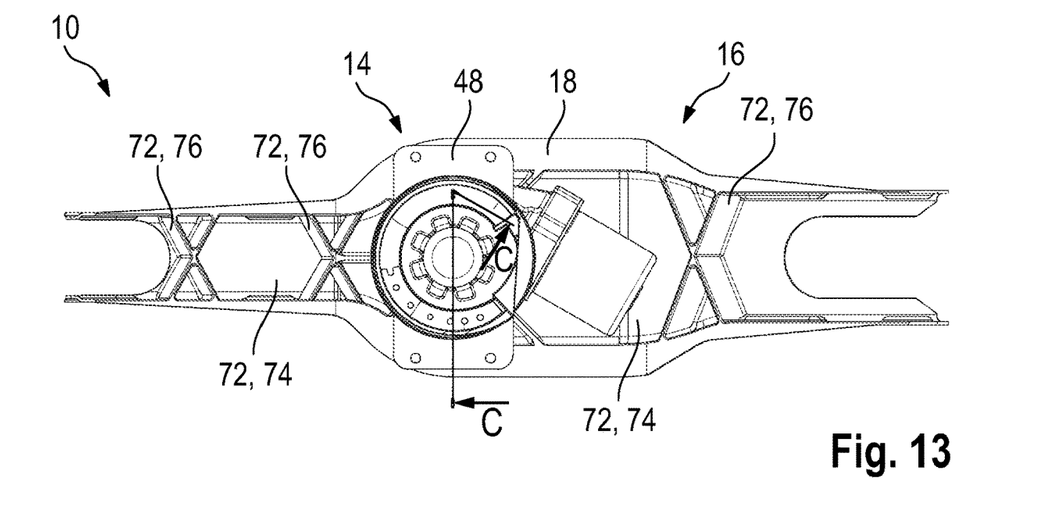
FIG. 13 shows a top view of a ninth variant of attachment of the actuator to the control arm body of the chassis control arm of the invention as shown in FIGS. 1 and 2.
Figure 14:
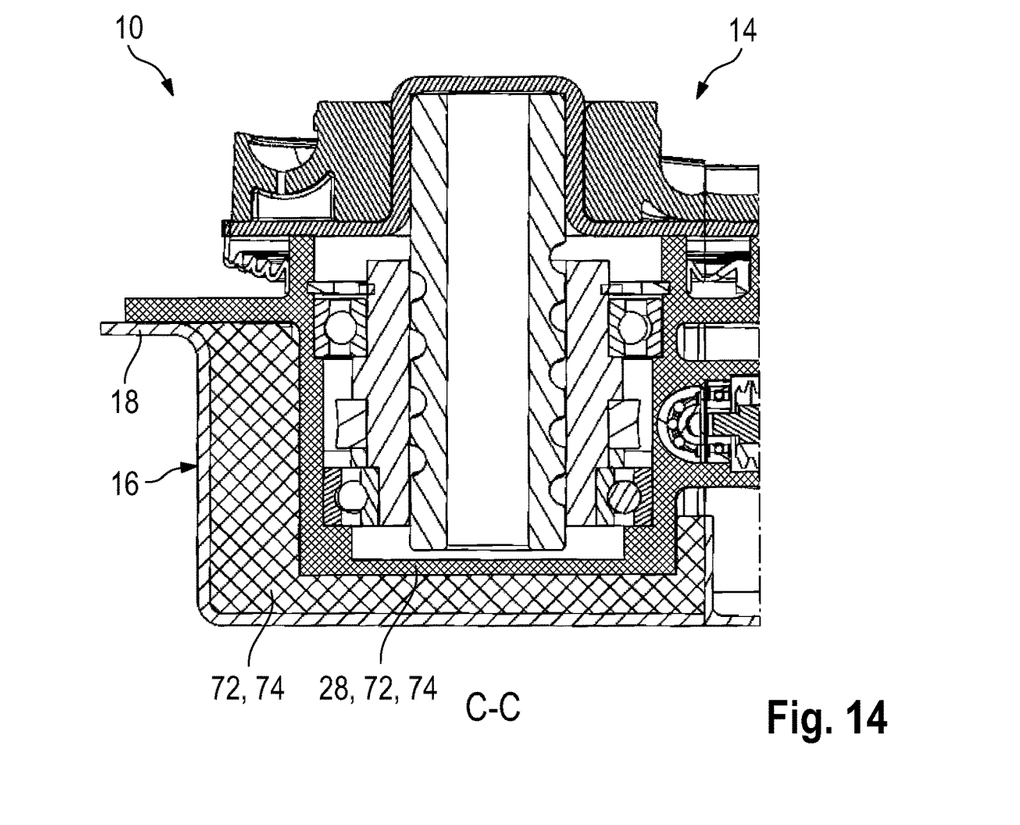
FIG. 14 shows a sectional view of the ninth variant of attachment of the actuator to the control arm body of the chassis control arm of the invention according to section C-C of FIG. 13.

FIGS. 13 and 14 show an eighth variant of attachment in which the chassis control arm 10 is fabricated as a metal-plastic composite component by means of a cohesive hybrid connection 72. For this purpose, the control arm body 16 is configured of a metallic material and the actuator housing 28 is configured of a thermoplastic or thermosetting material.

For manufacturing the metal-plastic composite component the control arm body 16 is inserted into an injection molding tool as an insert part. A cavity obtained in the tool forms an image of the actuator housing geometry and optionally of the geometry of the reinforcing ribs 76. Subsequently, the liquid plastic material is injected into the cavity, for example by way of an injection molding, RTM or T-RTM process. After solidification of the plastic material, the plastic component 74 thus obtained undergoes a cohesive connection with the control arm body 16. The connection can be reinforced for example by forming mechanical undercuts, for example holes in the control arm body 16, or by using an adhesion promoter.

The injection-molded plastic component 74 thus serves as a reinforcement of the control arm body 16 on the one hand and as an actuator housing 28.

Figure 15:
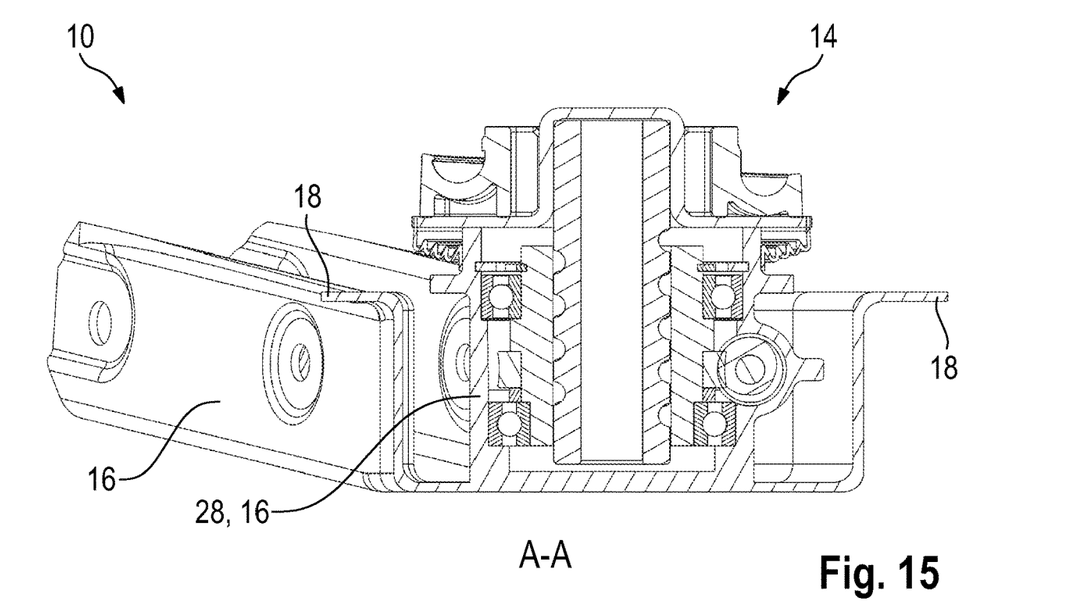
FIG. 15 shows a sectional view of a tenth variant of attachment of the actuator to the control arm body of the chassis control arm of the invention according to section A-A of FIG. 3.

According to a ninth variant of attachment as shown in FIG. 15, the connection of the actuator housing 28 to the control arm body 16 is effected directly in a manufacturing process. The actuator housing 28 is integrally molded to the control arm body 16 so that the control arm body 16 and the actuator housing 28 together form a component.

Such a component can be manufactured for example by machining from the full, direct injection molding or RTM. As a material suitable for the composite, metallic materials as well as plastics and hybrid materials can be used.

It can also be provided that the control arm body 16 and the actuator housing 28 each form a sub-housing of the actuator 14.

In all of the embodiments of the chassis control arm 10 described above the lifting nut 32 is put into rotation in the lifting gear 24 of the actuator 14, whereby the lifting spindle 34 is axially shifted.

Figure 16:
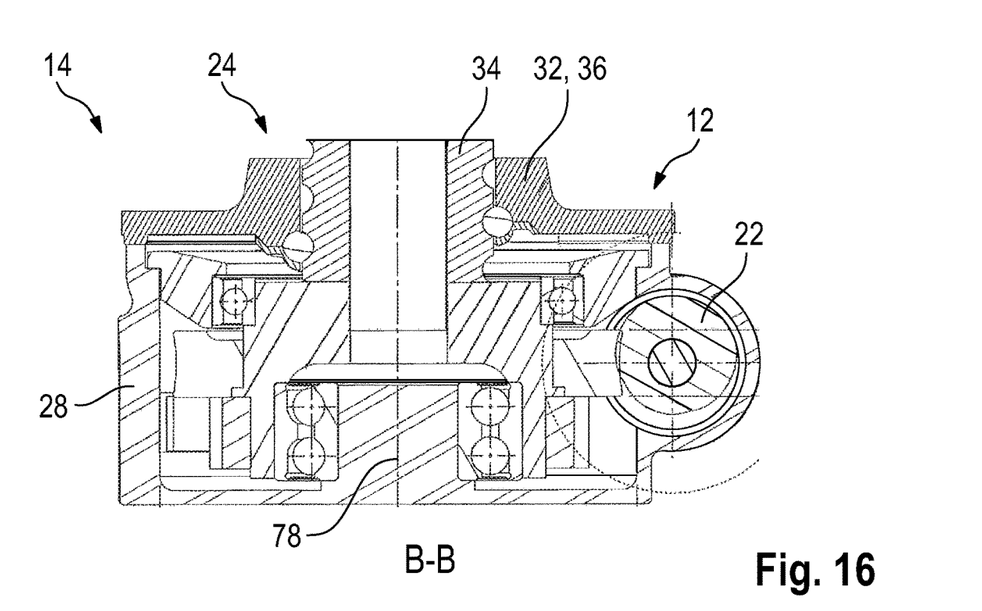
FIG. 16 shows a sectional view of another embodiment of a lifting gear of the actuator of the chassis control arm of the invention according to section B-B of FIG. 3.

In the embodiment as shown in FIG. 16, however, the lifting spindle 34 is rotatorily movably mounted in the actuator housing 28 and is put into rotation about its longitudinal axis 78 via the drive gear 22.

The spring abutment 12 is axially movably mounted on the lifting spindle 34 along the longitudinal axis 78 of the lifting spindle 34.

The spring plate 36 of the spring abutment 12 at the same time represents the lifting nut 32 and during a rotation of the lifting spindle 34 axially moves along the lifting spindle 34.

Due to the displacement of the lifting nut 32 and hence of the spring abutment 12, the spring 7 supported on the spring abutment 12 is shifted along the longitudinal axis 78 of the lifting spindle 34 or of the spring axis 9.

Expressed in other words, the lifting nut 32 in this embodiment is coupled with the lifting spindle 34 in such a way that the rotational movement of the lifting spindle 34 is converted into a translational axial movement of the lifting nut 32.

The properties and features of the individual embodiments described above of course are to be understood by way of example only and can also be combined with each other.

The invention claimed is:

1. A chassis control arm for a wheel suspension, comprising:
   a control arm body, a spring abutment and an actuator which is arranged between the control arm body and the spring abutment, wherein the actuator is configured to adjust a position of the spring abutment relative to the control arm body,
   wherein the actuator includes a lifting gear which is configured as a movement thread, the lifting gear includes a lifting spindle of which the spring abutment is arranged thereon,
   wherein the actuator further includes a housing which is cohesively attached to the control arm body,
   wherein the actuator housing is made of a thermoplastic plastic material and the control arm body is made of a metallic material, and
   wherein the cohesive attachment of the actuator housing to the control arm body is configured to be formed thereof by heating the control arm body to a melting temperature of the thermoplastic plastic material of the actuator housing and undergoing solidification.

2. The chassis control arm of claim 1, wherein the control arm body includes a mounting flange in contact with a flange-like protrusion of the actuator housing.

3. The chassis control arm of claim 1, wherein the control arm body is shaped such that the control arm body forms a part of the housing for the actuator.

4. The chassis control arm of claim 1, wherein the control arm body in cross-section forms a receiving space in which the actuator is received.

5. The chassis control arm of claim 1, wherein the lifting spindle is partly received in the actuator housing.

6. The chassis control arm of claim 1, wherein the lifting spindle is at least one of axially shiftably or rotatably mounted in the actuator housing.

7. The chassis control arm of claim 1, wherein a lifting nut can be axially adjusted by the lifting spindle.

8. The chassis control arm according to claim 1, wherein the spring abutment is mounted directly on the lifting spindle.

9. The chassis control arm according to claim 1, wherein the spring abutment is directly located on the lifting spindle.

10. The chassis control arm according to claim 1,
    wherein a plastic component is configured as a reinforcement of the control arm body and as the actuator housing.

11. The chassis control arm according to claim 1,
    wherein the control arm body in cross-section is H-shaped and forms a receiving space in which the actuator is received, and wherein the receiving space is configured as a protective space for protecting the actuator from external influences.

12. The chassis control arm of claim 1, wherein the actuator housing is made of at least one of a glass fiber reinforced plastic material or a carbon fiber reinforced plastic material.

13. The chassis control arm of claim 1, wherein the lifting spindle of which the spring abutment is mounted thereon is configured to axially move.

14. The chassis control arm of claim 1, wherein the actuator housing is made from a thermoplastic hybrid material.

15. The chassis control arm of claim 1, wherein the control arm body in cross-section is U-shaped and forms a receiving space in which the actuator is received.

* * * * *